(12) United States Patent
Takhirov et al.

(10) Patent No.: US 11,046,313 B2
(45) Date of Patent: Jun. 29, 2021

(54) AUTONOMOUS VEHICLE TRAIN

(71) Applicant: Beijing Voyager Technology Co., Ltd., Beijing (CN)

(72) Inventors: Zafar Takhirov, Santa Clara, CA (US); Alice Tsing Takhirov, Santa Clara, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 289 days.

(21) Appl. No.: 16/216,784

(22) Filed: Dec. 11, 2018

(65) Prior Publication Data

US 2020/0180625 A1 Jun. 11, 2020

(51) Int. Cl.
*B60W 30/165* (2020.01)
*B60W 30/18* (2012.01)

(52) U.S. Cl.
CPC ...... *B60W 30/165* (2013.01); *B60W 30/1819* (2013.01); *B60W 2554/80* (2020.02); *B60W 2556/65* (2020.02); *B60W 2754/10* (2020.02)

(58) Field of Classification Search
CPC ........... B60W 30/165; B60W 30/1819; B60W 2754/10; B60W 2556/65; B60W 2554/80
See application file for complete search history.

(56) References Cited

U.S. PATENT DOCUMENTS

| | | | |
|---|---|---|---|
| 6,356,820 B1 | 3/2002 | Hashimoto et al. | |
| 8,352,112 B2 | 1/2013 | Mudalige | |
| 2009/0012666 A1 | 1/2009 | Simpson et al. | |
| 2010/0044998 A1 | 2/2010 | Franchineau | |
| 2013/0079953 A1 | 3/2013 | Kumabe | |
| 2018/0022405 A1* | 1/2018 | Gecchelin | B62D 47/006 701/23 |

FOREIGN PATENT DOCUMENTS

CN 102261919 A 11/2011

OTHER PUBLICATIONS

PCT International Search Report and the Written Opinion dated Apr. 10, 2019, issued in related International Application No. PCT/US2018/068120 (8 pages).

* cited by examiner

*Primary Examiner* — Michael D Lang
(74) *Attorney, Agent, or Firm* — Sheppard Mullin Richter & Hampton LLP

(57) ABSTRACT

Systems and methods are provided for forming a vehicle train. An exemplary method may comprise: detecting, by a first vehicle, a second vehicle traveling in the same direction as the first vehicle on a road; receiving travel information of the second vehicle; determining, by the first vehicle, a lead vehicle of the vehicle train between the first vehicle and the second vehicle based on travel information of the first vehicle and the travel information of the second vehicle; and connecting the first vehicle and the second vehicle to form the vehicle train.

20 Claims, 14 Drawing Sheets

600

602: Detecting, by a first vehicle, a second vehicle traveling in the same direction as the first vehicle on a road 604: Requesting, by the first vehicle, a public data packet associated with the second vehicle via a communication signal, wherein the public data packet associated with the second vehicle comprises travel information of the second vehicle 606: In response to receiving the public data packet associated with the second vehicle, determining, by the first vehicle, a lead vehicle of a vehicle train among the first vehicle and the second vehicle based on the public data packet associated with the second vehicle and a public data packet associated with the first vehicle, wherein the lead vehicle controls the vehicle train 608: in response to determining the first vehicle as the lead vehicle, latching, by the first vehicle, to the front or back of the second vehicle to form the vehicle train 610: in response to determining the second vehicle as the lead vehicle, monitoring, by the first vehicle, a latch signal from the second vehicle to latch on to the second vehicle; and transmitting, by the first vehicle, the public data packet associated with the first vehicle to the second vehicle

622: identifying, by a first vehicle, a lead vehicle of the vehicle train traveling in the same direction as the first vehicle on a road

624: sending, by the first vehicle, a request to join the vehicle train to the lead vehicle

626: in response to receiving an approval of the request from the lead vehicle, transmitting, by the first vehicle, a public data packet associated with the first vehicle to the lead vehicle through a communication signal, wherein the public data packet associated with the first vehicle comprises travel information of the first vehicle

628: receiving, by the first vehicle, position information from the lead vehicle, wherein the position information comprises a position in the vehicle train assigned to the first vehicle

630: joining, by the first vehicle, the vehicle train at the assigned position, wherein the first vehicle latches on to one or more neighbor vehicles in the vehicle train

FIGURE 6B

AUTONOMOUS VEHICLE TRAIN

TECHNICAL FIELD

This disclosure generally relates to vehicles, and in particular, to autonomous vehicles and methods for forming a vehicle train.

BACKGROUND

Traditionally, drivers follow an "every man for himself" type of behavior when they drive vehicles on roads, as long as the behavior does not violate any traffic regulations. One of the rules of thumb commonly used is a "two-second" rule—staying at least two seconds behind the vehicle in front of your vehicle. This approach may create multiple problems: 1) it under-utilizes roads by creating a "buffer-zone" between vehicles; 2) it may create confusion for other drivers who may try to "squeeze-in", thinking that the space between the two vehicles is enough for another one; 3) in some cases, it may cause troubles for the drivers who follow larger vehicles that obstruct visibility. This approach is necessary for human-driven vehicles due to the limited human reaction time.

Existing autonomous vehicles or partially-autonomous vehicles also implement a buffer zone between vehicles in the same lane. For example, current self-driving vehicles (SDVs) are also designed to rely only on their own sensory input, and use a "greedy" approach to drive from a place to a destination as fast and safe as possible, without taking into account a "global optimization" of traffic on highways or any other long-distance roads.

SUMMARY

Various embodiments of the present disclosure can include systems and methods for forming a vehicle train, joining a vehicle train, or connecting multiple vehicle trains. According to one aspect, an exemplary method for forming a vehicle train may comprise detecting, by a first vehicle, a second vehicle traveling in the same direction as the first vehicle on a road; receiving travel information of the second vehicle; determining, by the first vehicle, a lead vehicle of the vehicle train between the first vehicle and the second vehicle based on travel information of the first vehicle and the travel information of the second vehicle; and connecting the first vehicle and the second vehicle to form the vehicle train.

In some embodiments, the travel information of the second vehicle comprises one or more of destination information or information on a distance to be traveled on the road. In some embodiments, determining the lead vehicle of the vehicle train may comprise: determine which vehicle is to travel a longer distance on the road based on the travel information of the first and second vehicles; and determining the one that is to travel the longer distance on the road as the lead vehicle.

In some embodiments, receiving travel information of the second vehicle may further comprise receiving additional information comprising one or more of battery information, sensor information, or gas information of the second vehicle.

In some embodiments, connecting the first vehicle and the second vehicle may comprise: matching a speed of the first vehicle and the second vehicle; aligning the first vehicle and the second vehicle; and moving the first vehicle and the second vehicle toward each other until a latch of the first vehicle engages with a latch of the second vehicle. In some embodiments, the method may further comprise connecting a control line of the first vehicle with a control line of the second vehicle. In some embodiments, the method may further comprise determining whether the control lines of the first and second vehicles have been connected; and if yes, connecting a power line between the first vehicle and the second vehicle.

In some embodiments, the method may further comprise communicating, by the lead vehicle, a brake signal to the other vehicle, wherein the brake signal includes an instruction on braking the other vehicle. In some embodiments, the method may further comprise determining, by the lead vehicle, to change from a current lane to another lane; communicating, by the lead vehicle, a change-lane signal to the other vehicle; disconnecting the first vehicle and the second vehicle; and re-connecting the first vehicle and the second vehicle after the first vehicle and the second vehicle both have changed to the another lane.

In some embodiments, the method may further comprise receiving, by the lead vehicle, a request to join the vehicle train from a third vehicle, wherein the request comprises travel information of the third vehicle; determining, by the lead vehicle, whether to approve the request from the third vehicle based on the travel information of the third vehicle; if approved, determining, by the lead vehicle, a position in the vehicle train of the third vehicle based on the traveling information of the third vehicle; and connecting the third vehicle in the vehicle train at the determined position. In some embodiments, determining whether to approve the request from the third vehicle may be further based on the number of vehicles in the vehicle train. In some embodiments, determining, by the lead vehicle, a position in the vehicle train of the third vehicle may be further based on the travel information of the other vehicles in the vehicle train.

In some embodiments, the method may further comprise receiving, by the lead vehicle, a request to exit from the vehicle train from one of the vehicles in the vehicle train; determining, by the lead vehicle, whether to approve the request to exit from the vehicle train based on environment information detected by sensors of the vehicles in the vehicle train; and in response to determining to approve the request to exit from the vehicle train, releasing, the connection of the each of the one or more neighbor vehicles in the vehicle train to allow the vehicle to exit from the vehicle train.

According to another aspect, the present disclosure provides a method for joining a vehicle train. The method may comprise identifying, by a first vehicle, a lead vehicle of a vehicle train traveling in the same direction as the first vehicle on a road; sending, by the first vehicle, a request to join the vehicle train to the lead vehicle, the request including travel information of the first vehicle; receiving, by the first vehicle, position information indicating a position in the vehicle train assigned to the first vehicle from the lead vehicle; and connecting, by the first vehicle, to the vehicle train at the assigned position.

In some embodiments, the travel information may comprise a distance to be traveled on the road or a destination of the first vehicle. In some embodiments, the first vehicle may be a lead vehicle of another vehicle train. The method may further comprise connecting vehicles in the other vehicle train to the vehicle train. In some embodiments, the position information is determined based on the travel information of the first vehicle.

According to yet another aspect, a system for forming a vehicle train may comprise one or more processors; and a memory storing instructions that, when executed by the one or more processors, cause the system to perform: detecting, by a first vehicle, a second vehicle traveling in the same direction as the first vehicle on a road; receiving travel information of the second vehicle; determining, by the first vehicle, a lead vehicle of the vehicle train between the first vehicle and the second vehicle based on travel information of the first vehicle and the travel information of the second vehicle; and connecting the first vehicle and the second vehicle to form the vehicle train.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 6A illustrates a flowchart of an exemplary method for forming a vehicle train, in accordance with various embodiments.

FIG. 6B illustrates a flowchart of an exemplary method for joining a vehicle train, in accordance with various embodiments.

DETAILED DESCRIPTION

Figure 1A:
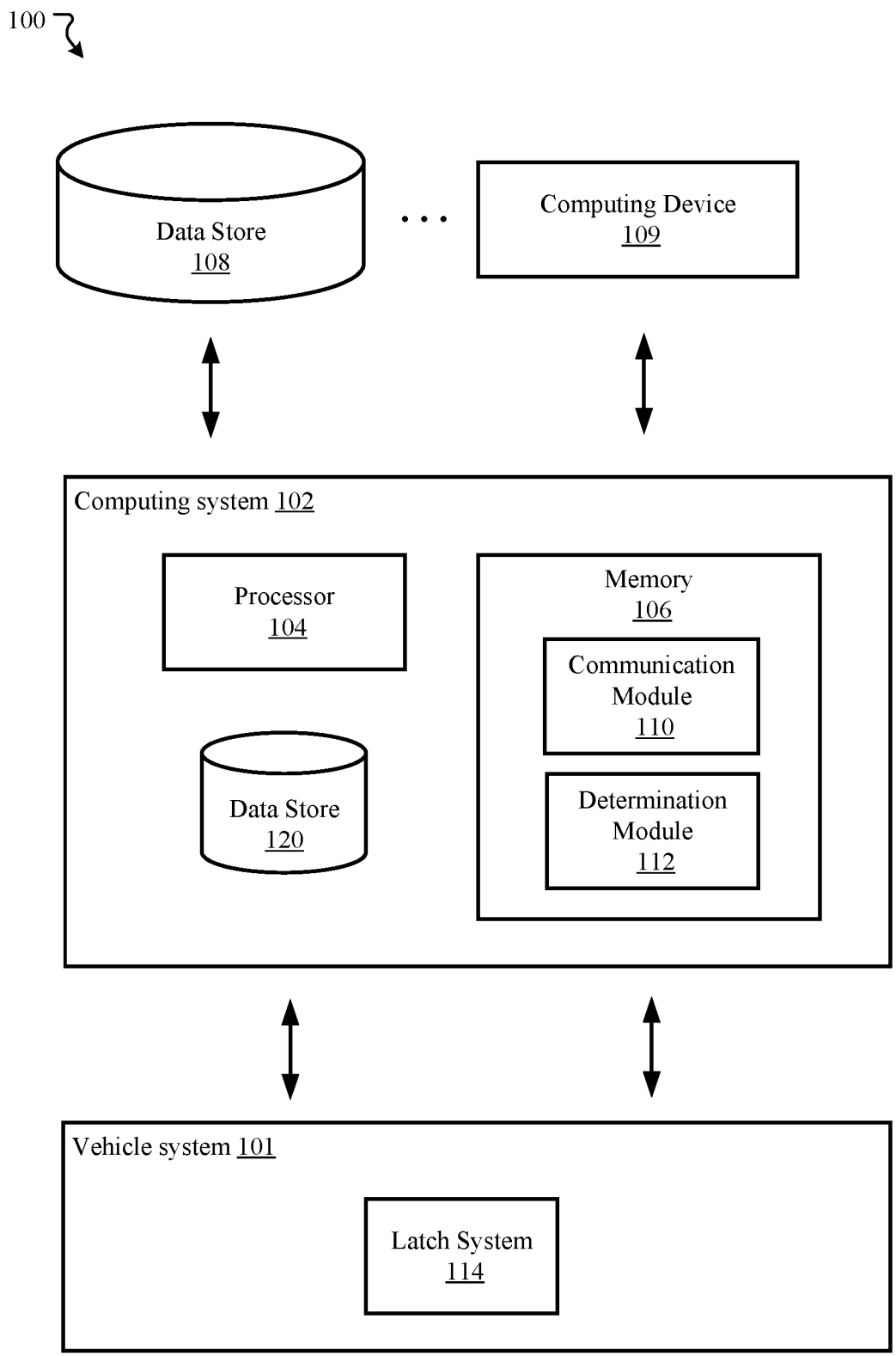
FIG. 1A illustrates an exemplary system for forming a vehicle train, in accordance with various embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

The present disclosure provides a mechanism of driving that allows multiple fully-autonomous vehicles or partially-autonomous vehicles (also referred to as SDVs) to act in unison and utilizes roads in a more efficient way. In some embodiments, when multiple vehicles are driving on a highway, they may communicate with each other and create a vehicle train. For example, a SDV may communicate with the nearest SDV and form a vehicle train with the nearest SDV. A vehicle train (also referred to as a "train" hereinafter) may be defined as a set of two or more vehicles that are physically connected together (e.g., latched on to each other) and/or have a virtual connection with the two or more vehicles moving as one entity. In some embodiments, a vehicle train may include one vehicle that has the functionalities of communicating with other vehicles or other vehicle trains, connecting with other vehicles or other vehicle trains, leading a vehicle train, etc. In some embodiments, a vehicle train may include two or more vehicles which are sequentially latched one after another. In some embodiments, the two or more vehicles physically connect to each other in a similar way railroad train cars do, and utilize each others' sensors, engines or other components to function.

In a multi-vehicle example: assume there are two vehicles on a road. These vehicles may be fully or partially autonomous. After communicating with each other, the two vehicles detect that they are moving in the same direction for another 50 miles. The two vehicles may latch on to each other to form a train, thus combining their sensors and batteries in order to maximize the utilization. The vehicle that exits the road first may latch on to the back of the other vehicle. The front vehicle may become the lead of the train as it stays on this route the longest, and also has the most visibility in the direction of the movement. In some embodiments, the other vehicle may also use its sensors to provide the lead vehicle information about the side and back of the traffic flow. The motors or engines of both vehicles may be used to drive the formed train forward. Because the back vehicle experiences less drag, it may consume less energy. The excess energy may then be shared with the front vehicle in order to balance the consumption. For example, if the vehicles are electric vehicles, one vehicle's battery may charge another vehicle's battery. That way, the net energy consumed may be lower if compared to two vehicles driving independently. Assume that another vehicle enters the road, and after communicating with the current "train," it determines that it can join the train for another 10 miles. Because the new vehicle may join only for a short fraction of the trip, it may join in the back of the "train" to have a smooth exit once it reaches the point of breaking off from the train.

FIG. 1A illustrates an exemplary system 100 for forming a vehicle train, in accordance with various embodiments. As shown in FIG. 1A, the exemplary system 100 can comprise at least one computing system 102 that includes one or more processors 104, memory 106 and a data store 120. The memory 106 may be non-transitory and computer-readable. The memory 106 may store instructions that, when executed by the one or more processors 104, cause the one or more processors 104 to perform various operations described herein. For example, the memory 106 may include a communication module 110 and a determination module 112, which are described in detail hereinafter. The data store 120 may store data used to perform the various operations described herein. The computing system 102 may be implemented on or as various devices such as mobile phone, tablet, server, computer, wearable device (smart watch), a vehicle computer, etc. The computing system 102 may be installed with appropriate software (e.g., data transfer program, etc.) and/or hardware (e.g., wire connections, wireless connections, etc.) to access other devices of the system 100.

The system 100 may include one or more data stores (e.g., a data store 108) and one or more computing devices (e.g., a computing device 109) that are accessible to the computing system 102. In some embodiments, the computing system 102 may be configured to obtain data (e.g., location, time, moving speed, acceleration, map) from the data store 108 (e.g., a cloud database) and/or the computing device 109 (e.g., a server, a mobile phone). The system 100 may further include a vehicle system 101 coupled to the computing system 102. In some embodiments, the vehicle system 101 may be a human-driving vehicle. In some embodiments, the vehicle system 101 may be a partially autonomous or fully autonomous vehicle. For example, the vehicle system 101 may be any level autonomous vehicle (e.g., from level one to level five). The vehicle system 101 may comprise a latch system 114 for physically connecting the vehicle system 101 with one or more other vehicle systems (similar to the vehicle system 101).

In some embodiments, the computing system 102 and the one or more of the computing devices (e.g., the computing device 109) may be integrated in a single device or system. Alternatively, the computing system 102 and the one or more computing devices may operate as separate devices. The one or more data store (e.g., the data store 108) may be anywhere accessible to the computing system 102, for example, in the memory 106, in the data store 120, in the computing device 109, in another device (e.g., network storage device) coupled to the computing system 102, or another storage location (e.g., cloud-based storage system, network file system, etc.), etc. The computing system 102 may be implemented as a single system or multiple systems coupled to each other. In general, the computing system 102, the computing device 109, the data store 108, and the vehicle system 101 may be able to communicate with one another through one or more wired or wireless networks (e.g., the Internet) through which data can be communicated.

Figure 1B:
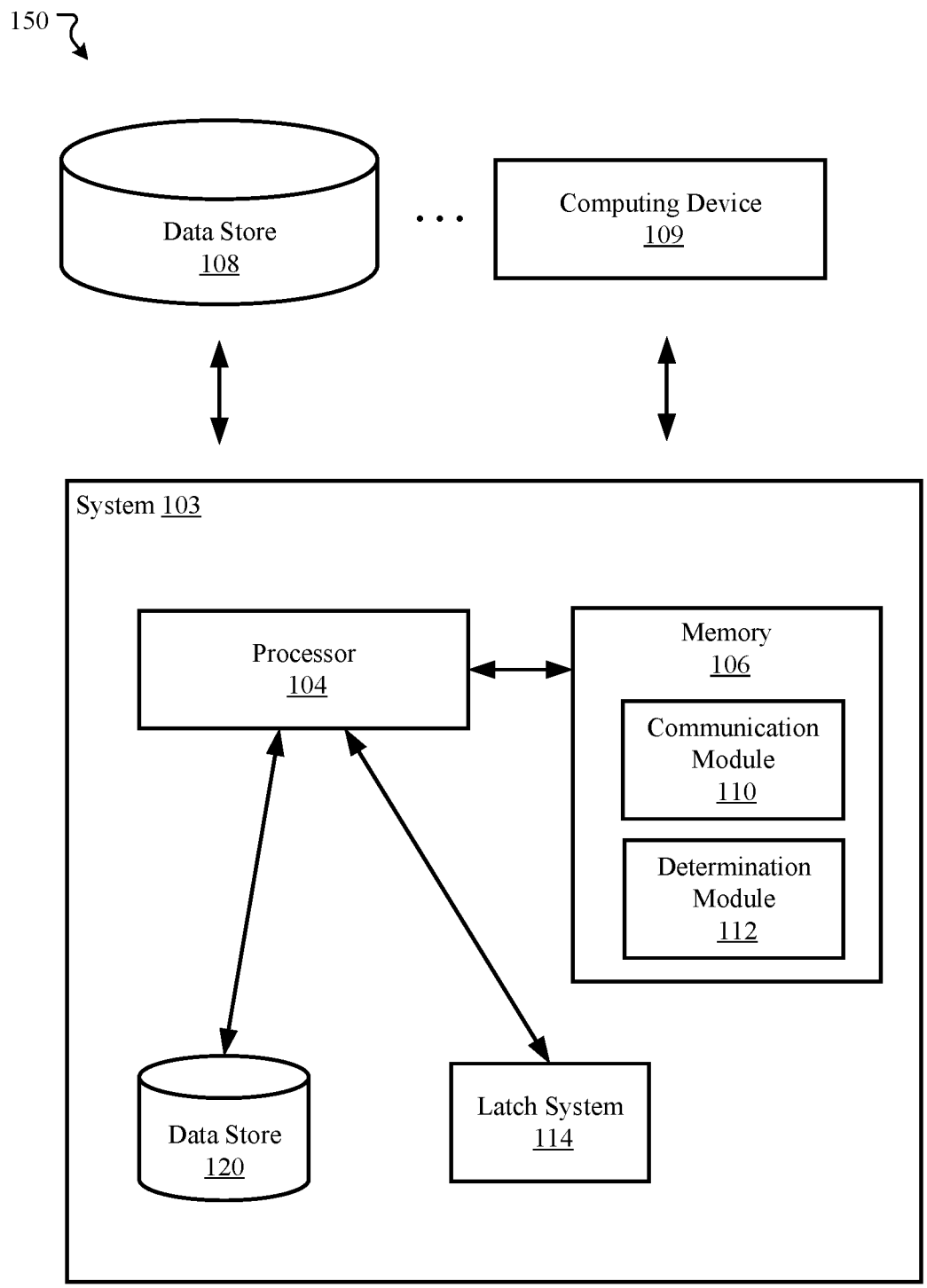
FIG. 1B illustrates another exemplary system for forming a vehicle train, in accordance with various embodiments.

FIG. 1B illustrates another exemplary system 150 for forming a vehicle train, in accordance with various embodiments. The operations shown in FIG. 1B and presented below are intended to be illustrative. The system 150 is similar to the system 100 described above, except that the computing system 102 and the vehicle system 101 illustrated in FIG. 1A are merged to obtain the system 103 in FIG. 1B. The system 103 may be implemented as a vehicle system with an integrated computing system. The system 103 may comprise a processor 104, a memory 106 (including the communication module 110 and the determination module 112), a data store 120, a latch system 114, each configured to perform functions similar to those described above with reference to FIG. 1A. The data store 108 and the computing device 109 may be coupled or integrated to the system 103. In the following embodiments, only one of the vehicle systems 101 and 103 is described, for example, the vehicle system 103. A person having ordinary skill should understand that the descriptions can be applied to the vehicle system 101.

In some embodiments, the communication module 110 may be configured to communicate with communication components associated with other vehicle systems (similar to the system 103) via one or more wired or wireless networks. In some embodiments, the communication module 110 may broadcast information (e.g., travel information, battery information, sensor information, gas information, etc.) to vehicles driving around on a road. For example, when the vehicle system 103 drives on a highway, the communication module 110 may broadcast destination information indicating a destination of the vehicle system 103 to vehicles driving nearby on the same highway. The communication module 110 may also receive information broadcasted from other vehicles driving nearby on the same road.

In some embodiments, the communication module 110 may establish a one-to-one communication connection with a particular vehicle. For example, the communication module 110 may exchange information with a candidate vehicle via a one-to-one communication connection. In some embodiments, a candidate vehicle to the vehicle system 103 may be defined as the nearest vehicle in distance that drives in the same direction on the same road as the vehicle system 103 and that can be connected to the vehicle system 103. For example, the communication module 110 may send a request to the nearest vehicle for forming a vehicle train together. In another example, the communication module 110 may exchange information with a lead vehicle of a vehicle train traveling around on the road via a one-to-one communication. The communication module 110 may send a request to join the train to the lead vehicle of the train, and receive either an approval or rejection from the lead vehicle. In some embodiments, the candidate vehicle may not be of the same type as the vehicle system 103. Further, multiple vehicles in a train may not be of the same type. For example, the vehicles may be one or more of any level autonomous vehicle (e.g., from level one to level five).

In some embodiments, a lead vehicle may be the vehicle in the vehicle train that control and/or manage the one or more other vehicles in the vehicle train. For example, a lead vehicle of a train may be the vehicle positioned at the head of the train, having all the other vehicles in the train behind it. In another example, a lead vehicle of a train may be the vehicle positioned at the end of the train, having all the other vehicles in the train in front of it. Alternatively, a lead vehicle in a train may be the vehicle in the middle of the train, or in any place of the train. The lead vehicle may maintain a list of vehicles in the train. Further, the lead vehicle (through its communication module 110) may request and receive information from the one or more other vehicles in the train. The lead vehicle may control the driving, turning, stopping, and other operations of the train. Furthermore, the lead vehicle (through its communication module 110) may request and receive information from a vehicle requesting to join the train. In some embodiments, there is no lead vehicle in a train, and the vehicles manage the train in a distributed manner. Determination of the candidate vehicle and the lead vehicle, as well as operations associated with them, are described in detail below with reference to the determination module 112, and FIGS. 2A-2C.

In some embodiments, the information communicated between the vehicles may include a public data packet. A public data packet may be communicated between the vehicles based on authorizations of the vehicles. A public data packet associated with a vehicle system (e.g., the vehicle system 103) may include data describing travel information of the vehicle system, battery information of the vehicle system, sensor information of the vehicle system, gas information of the vehicle system, etc. The travel information may describe a place of departure, a direction, one or more destinations, a path, a distance to be traveled on a road, a period of time to be traveled on a road that is calculated based on traffic, etc. The battery information may describe the type of the battery, a status of the battery (e.g., a remaining battery power or level), etc. The sensor information of the vehicle system may include data captured by one or more sensors of the vehicle system (e.g., image sensor, LIDAR, Radar sensor, temperature sensor, speed sensor, etc.). The gas information of the vehicle system may indicate a gas level of the vehicle system. Other information may be included in the public data packet of a vehicle system that is communicated with other vehicle systems.

The determination module 112 may be configured to determine whether and how to form a vehicle train with one or more other vehicles, join an existing vehicle train, or exit from an existing vehicle train. In some embodiments, the determination module 112 may determine the candidate vehicle to the vehicle system 103 based on sensor information captured by sensors equipped on the vehicle system 103, or based on information in the public data packets broadcasted by other vehicles driving nearby. For example, sensors (e.g., image sensor, LIDAR, Radar sensor) may capture signals indicating another vehicle driving in front of or behind the vehicle system 103, on the same road, but not necessarily in the same lane. Sensor data may also indicate that the other vehicle drives the nearest to the vehicle system 103 compared with other vehicles captured by the sensors. The determination module 112 may receive or retrieve the sensor data, and determine the other vehicle as a candidate vehicle.

In another example, vehicles driving on road may broadcast public data packets periodically to other vehicles on the road. The travel information in the public data packet may describe a direction, one or more destinations, a planned path, a distance to be traveled on a road, etc., as described above. The determination module 112 may determine a candidate vehicle based on the travel information. For example, if a vehicle's travel information indicates that the vehicle may plan to travel on the road in the same direction of the vehicle system 103 for another distance (e.g., 100 miles, 50 miles, 10 miles, 5 miles, etc.), the determination module 112 may determine the vehicle as a candidate vehicle based on such travel information.

As described above with reference to the communication module 110, once a candidate vehicle is determined, the communication module 110 may transmit a request to form a train to the candidate vehicle. In some embodiments, the determination module 112 may determine a lead vehicle between the vehicle system 103 and the candidate vehicle. The determination module 112 may determine a lead vehicle based on the information in the public data packets communicated between the vehicles. For example, if the travel information indicates that the vehicle system 103 plans to travel on the road longer than the candidate vehicle, the determination module 112 may determine the vehicle system 103 as the lead vehicle. In another example, if the battery information indicates that the vehicle system 103 has a higher battery level, the determination module 112 may determine the vehicle system 103 as the lead of the train. Alternatively, the determination module 112 may determine a lead vehicle of the to-be-formed train based on other information (e.g., sensor information, gas information). For example, if one of the vehicles has more sensors equipped on and/or is capable of capturing more sensor data, the determination module 112 may determine this vehicle as a lead.

In some embodiments, the determination module 112 may determine a lead vehicle between the vehicle system 103 and the candidate vehicle based on their current positions on the road. For example, the determination module 112 may determine the one driving in the front as the lead vehicle, and the one driving behind as only a member of the train. In another example, the determination module 112 may determine the one driving behind as the lead vehicle, and the one driving in the front as only a member of the train. Once a lead vehicle is determined, the determination module 112 may send a signal to the latch system 114 for latching the vehicles to form a vehicle train.

In some embodiments, when there is an existing vehicle train driving on the road, the vehicle system 103 or the vehicle system 101 (through the computing system 102) may identify the lead vehicle of the vehicle train based on information broadcasted or through an one-to-one communication. For example, a lead vehicle of a vehicle train may broadcast travel information to other vehicles driving around on the road that are not members of the vehicle train. The vehicle system 103 (through the computing system 102) may receive the broadcasted travel information, and the determination module 112 of the vehicle system 103 may determine the most suitable lead vehicle (or vehicle train) to join. The determination module 112 may determine based on a few factors, for example, a distance between itself and the lead vehicle or vehicle train, the speed of itself and the lead vehicle or vehicle train, the destination or the remaining travel distance on this road of itself and the lead vehicle or vehicle train, the power (battery and/or gas) of itself and the lead vehicle or vehicle train, etc. For example, the determination module 112 may identify the vehicle train (or the lead vehicle) traveling nearest to the vehicle system 103 in the same direction on the same road. In another example, the determination module 112 may identify the lead vehicle (or vehicle train) that travels the longest on the same road as the vehicle system 103. In yet another example, the determination module 112 may identify the lead vehicle (or train) that will travel the fastest on the road. One skilled in the art should appreciate other criteria may be used by the determination module 112 to determine the most suitable lead vehicle.

In some embodiments, the determination module 112 may cooperate with the communication module 110 to generate and transmit an invitation to form a train to the candidate vehicle, or a request to join the existing train to the lead vehicle, once the determination module 112 has determined the candidate vehicle or the most suitable lead vehicle, as described above. Accordingly, when the vehicle system 103 is a candidate vehicle or a lead vehicle, the determination module 112 may determine whether to accept the invitation, or whether to approve the request. For example, the determination module 112 may determine whether to accept the invitation or approve the request to join the train by the other vehicle based on a distance between itself and the lead vehicle or vehicle train, the speed of itself and the lead vehicle or vehicle train, the destination or the remaining travel distance on this road of itself and the lead vehicle or vehicle train, the power (battery and/or gas) of itself and the lead vehicle or vehicle train, a current traffic condition (e.g., collected through various resources), a current road condition (e.g., measured by sensors), a weather forecast, information in public data packets of both vehicles, etc. Alternatively, the determination module 112 may determine whether to accept the invitation, or whether to approve the request based on other criteria.

In some embodiments, the determination module 112 may determine a position in a vehicle train with a candidate vehicle or a lead vehicle. As described above, in the case of forming a vehicle train with the candidate vehicle, once information in the public data packets has been communicated between the vehicle system 103 and the candidate vehicle, the determination module 112 may compare the distance to be traveled on the road by the vehicle system 103 with the distance to be traveled on the road by the candidate vehicle. The determination module 112 may determine the one that is to travel the longer distance on the road as a lead vehicle of the to-be-formed train.

In the case of joining an existing train, the vehicle system 103 may be requested by the lead vehicle of the train (through the communication module 110) to share the public data packet of the vehicle system 103, a determination module on the lead vehicle (same or similar to the determination module 112) may determine a position in the train for the requesting vehicle system 103 based on the public data packet shared by the requesting vehicle system 103, and also based on public data packets from the vehicles in the train. For example, the determination module on the lead vehicle may compare the distance to be traveled by the requesting vehicle system 103 with the distances to be traveled by the lead vehicle and the one or more other vehicles in the train, and determine an order of the vehicles based on the values of the distances to be traveled by them. The determination module on the lead vehicle may determine a position for the requesting vehicle system 103. In a more specific example, if the vehicles in the train are to travel for another 100 miles, 50 mile and 10 miles, and the requesting vehicle system 103 is to travel on the same road for another 75 miles, then the position for the requesting vehicle system 103 is the second in the train (i.e., after the lead vehicle traveling for another 100 miles and before the vehicle traveling for another 50 miles). Once a position for the requesting vehicle 103 is determined, the determination module in the lead vehicle may send a signal to the latch system (same or similar to the latch system 114) for latching the vehicles to allow the vehicle 103 to join the train. The determination module in the lead vehicle may also send information of the determined position to the requesting vehicle 103 so that the requesting vehicle 103 may release one or more latches and join the train.

In some embodiments, where the lead vehicle of a train is autonomous driving vehicle, the determination module 112 in the lead vehicle may be a computer system that makes driving decisions for the autonomous driving vehicle. In some embodiments, the determination module 112 in the lead vehicle of a train may control the driving of the train (including the other vehicles). For example, the determination module 112 may cooperate with the communication module 110 to request the other vehicles in the train to update their public data packets and send the updated public data packets to the lead vehicle periodically. The determination module 112 may cooperate with the communication module 110 to communicate brake signals, change-lane signals, or other types of driving signals to the other vehicles in the train. In some embodiments, the determination module 112 in the lead vehicle of a train may monitor data from sensors to detect an emergency situation on the road. Once an emergency situation (e.g., a car accident) has been detected, the determination module 112 may determine to stop or slow down the train (including the other vehicles) through a latching mechanism (which is described in detail below with the latch system 114). The determination module 112 may communicate a signal of stop or slowing to a brake system of the lead vehicle for braking.

In some embodiments, when the determination module 112 in the lead vehicle determines to change from a current lane to a new lane, the determination module 112 may cooperate with the communication module 110 to communicate a change-lane signal to the other vehicles of the train, and send a signal to the latch system 114 for releasing the latch and disengaging with other vehicles. Once the lead vehicle (through the communication module 110) has received signals from the other vehicles that indicate the other vehicles have changed to the new lane, the determination module 112 may cooperate with the communication module 110 and the latch system 114 to assemble with the other vehicles to form the train. In some embodiments, to guarantee a smooth change of lane, the determination module 112 may control the number of vehicles in the train to be less than a threshold (e.g., three, four, or five) when determining whether to approve a request to join from a new vehicle. In some embodiments, the determination module 112 may detect a dedicated lane for longer vehicle or for a vehicle train, and drive the train on the dedicated lane.

In some embodiments, the determination module 112 in the vehicle train may cooperate with the communication module 110 to receive a request to exit from the vehicle train from another vehicle in the train. The determination module 112 may determine whether to approve the request to exit based on a variety of criteria. For example, the determination module 112 may determine whether to approve the request to exit based on environment information detected by sensors. For example, all other vehicles in the train may collect environment information (e.g., traffic information, road condition information, weather information, etc.) via sensors. The collected information may be sent to the lead vehicle for determination of whether to approve the exiting request. In another example, the determination module 112 may determine whether to approve the request to exit based on travel information or other information (e.g., battery information) in the public data packets of the vehicles in the train. Once the determination module 112 approves the request to exit, the communication module 110 may send a release signal to the neighbor vehicles to the requesting vehicle in the train such that the requesting vehicle may disengage with the neighbors and exit from the train. For example, the neighbor vehicles may disengage the latches by disabling the power of the latches. After the requesting vehicle exits from the train, determination module 112 of the lead vehicle may delete the public data packet of the exiting vehicle, and remove the exiting vehicle from a list of vehicles in the train.

In some embodiments, the determination module 112 in the lead vehicle of a train may divide the vehicles in the train into a number of groups based on a predetermined criteria. For example, the determination module 112 in the lead vehicle of a train may sort a number of vehicles into one group if they share roughly the same destination (e.g., having destinations within a small range such as 0.1 mile, 0.5 mile, 1 mile, 2 miles, etc.). The determination module 112 in the lead vehicle of a train may allow the vehicles in one group to be placed next to each other. In another example, the determination module 112 in the lead vehicle of a train may sort a number of vehicles into one group if their occupants are socially connected (e.g., family, friends, coworkers, etc.). In yet another example, the determination module 112 in the lead vehicle of a train may sort a number of vehicles into one group if they share most of the trip.

Figure 2A:
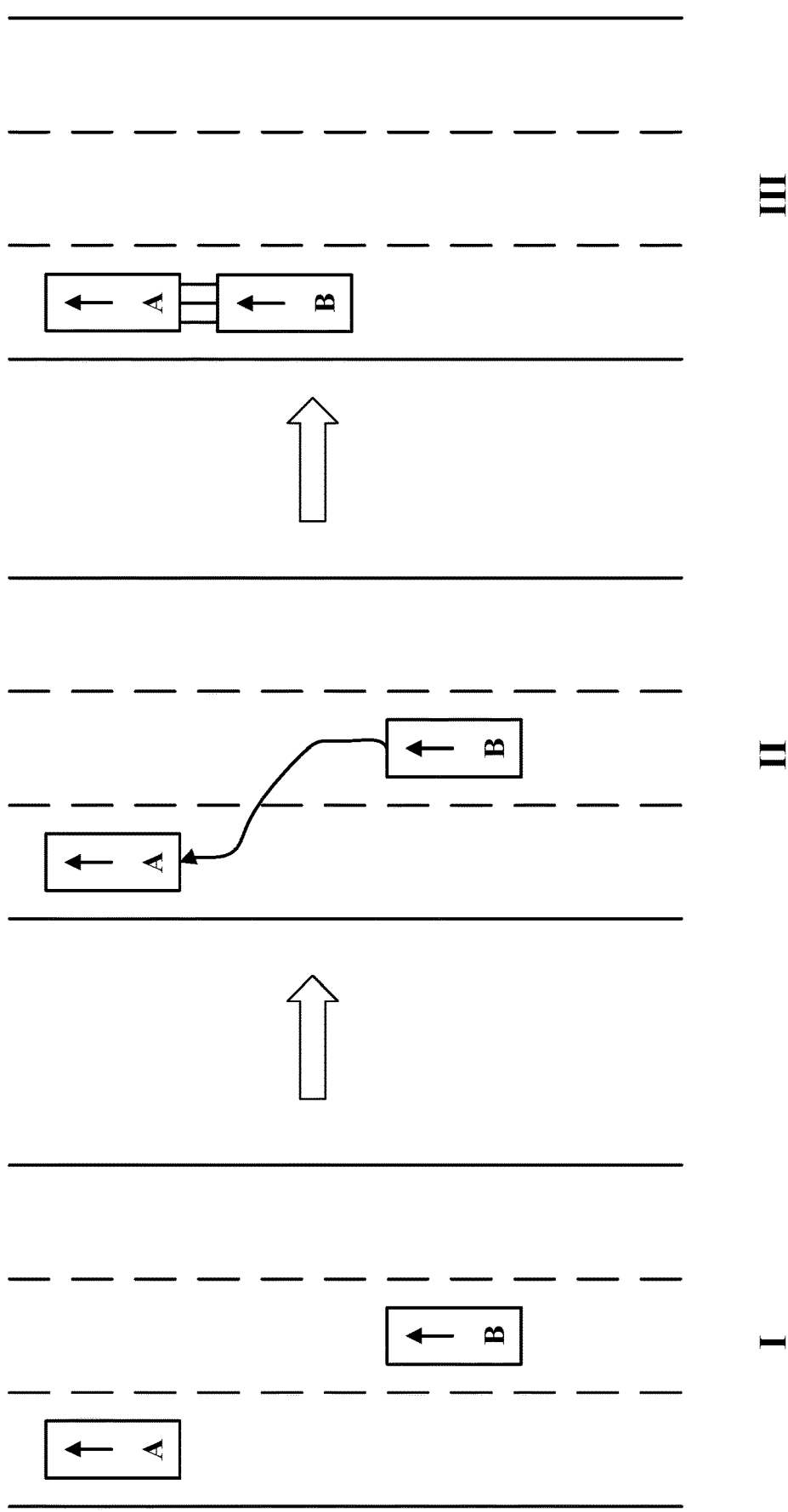
FIG. 2A illustrates an exemplary process of forming a vehicle train, in accordance with various embodiments.

FIG. 2A shows an exemplary process of forming a vehicle train, in accordance with various embodiments. In the illustrated embodiments in FIG. 2A, three stages of forming a vehicle train are depicted. In the first stage (stage I), two vehicles A and B (as represented by block A and block B) are driving on the road in the direction (as indicated by the arrows in the blocks). The two vehicles A and B may be the same as or similar to the vehicle system 103 described above with reference to FIGS. 1A and 1B. In stage I, one of the vehicles A and B may identify the other vehicle as a candidate vehicle. For example, the vehicle B may receive information (e.g., part or all information in the public data packet) broadcasted by the vehicle A. Based on the received information, the vehicle B determines that the vehicle A is the nearest vehicle driving in the same direction on the same road and the vehicle A is to travel on the road for a distance. Accordingly, the vehicle B may determine the vehicle A is a candidate vehicle to form a train. Alternatively, the vehicle B may use sensors to detect the vehicle A as a candidate vehicle.

In stage II, the vehicle B may send an invitation to the vehicle A to invite the vehicle A to form a train. Once the vehicle A accepts the invitation, the two vehicles A and B may communicate travel information or public data packets with each other and determine a lead vehicle among them. For example, based on the distances they are to travel on the road, the vehicle that is to travel the longer distance on the road may be determined as a lead vehicle. Alternatively, in one embodiment, only one vehicle, for example, vehicle A, communicates travel information or public data packets to the other vehicle, for example, vehicle B, and vehicle B determines which one is the lead vehicle based on vehicle A's travel information and its own travel information. In the illustrated embodiments of FIG. 2A, assume that the vehicle A is to travel longer than the vehicle B. The vehicle A may be determined as the lead vehicle of the to-be-formed train.

In stage III, the two vehicles A and B are latched on to each other to form a vehicle train. The vehicle A is the lead vehicle to control the driving of the train. In some embodiments, the vehicle A and B may share battery power, sensor data, etc. The latching process is described in detail with reference to the latch system 114 and FIGS. 3A-5.

Figure 2B:
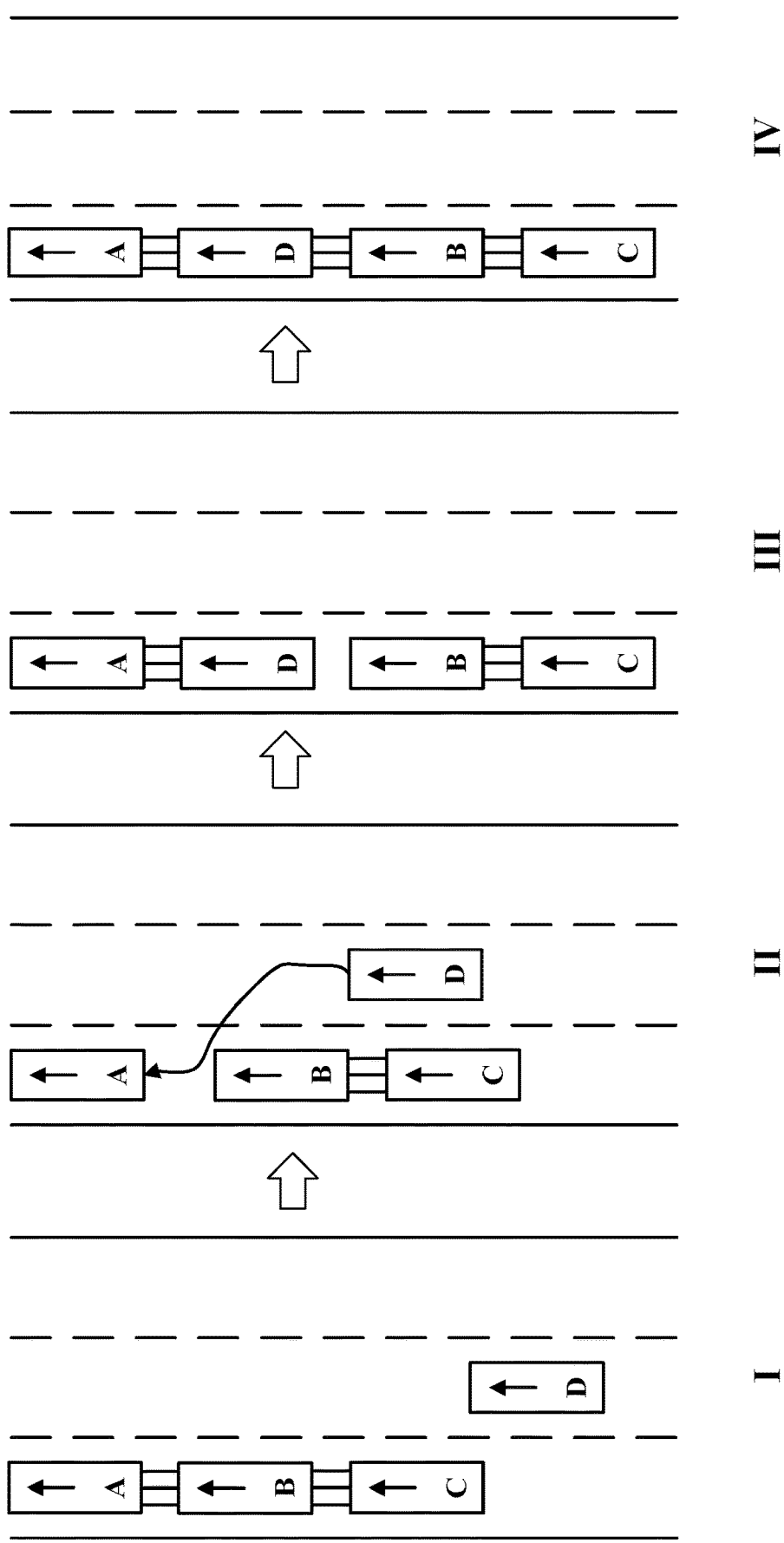
FIG. 2B illustrates an exemplary process of joining a vehicle train, in accordance with various embodiments.

FIG. 2B illustrates an exemplary process of joining a vehicle train, in accordance with various embodiments. As illustrated in FIG. 2B, in stage I, a vehicle train that includes vehicle A, vehicle B and vehicle C is driving on the road in the direction indicated by the arrows. Another vehicle D is also driving on the same road in the same direction indicated by the arrow. In some embodiments, the vehicle D may detect the vehicle train and identifies a lead vehicle (e.g., vehicle A) of the train, as described above with reference to FIGS. 1A-1B. The vehicle D may send a request to join the vehicle train to the lead vehicle such as vehicle A.

In stage II, the lead vehicle may determine whether to approve the request from the vehicle D based on environmental conditions and/or information in the public data packets of the vehicles in the train. The lead vehicle may also determine a position for the vehicle D once the lead vehicle has approved the request. For example, the lead vehicle may request the vehicle D to send its public data packet including information associated with the vehicle D (e.g., travel information, battery information, sensor information, gas information, etc.). The lead vehicle may compare the distance to be traveled by the vehicle D with each of the distance to be traveled by the each vehicle in the train (e.g., the vehicle A, the vehicle B and vehicle C). Assume that the vehicle A is to travel another 100 miles, the vehicle B is to travel another 50 miles and the vehicle C is to travel another 10 miles; while the vehicle D is to travel another 75 miles. Based on the distances to be traveled by the vehicles, the lead vehicle may determine that the vehicle D is to be positioned at the second to the front end of the train, i.e., behind the vehicle A, because the vehicle D is to travel for the second longest distance. In some embodiments, the lead vehicle may send signals to the vehicles that are becoming neighbors of the vehicle D to request them to release latches such that the vehicle D may be connected to them. In stage III and stage IV, the vehicle D may latch onto the vehicle A and vehicle B, respectively. Thus, the vehicle D has joined the train.

Figure 2C:
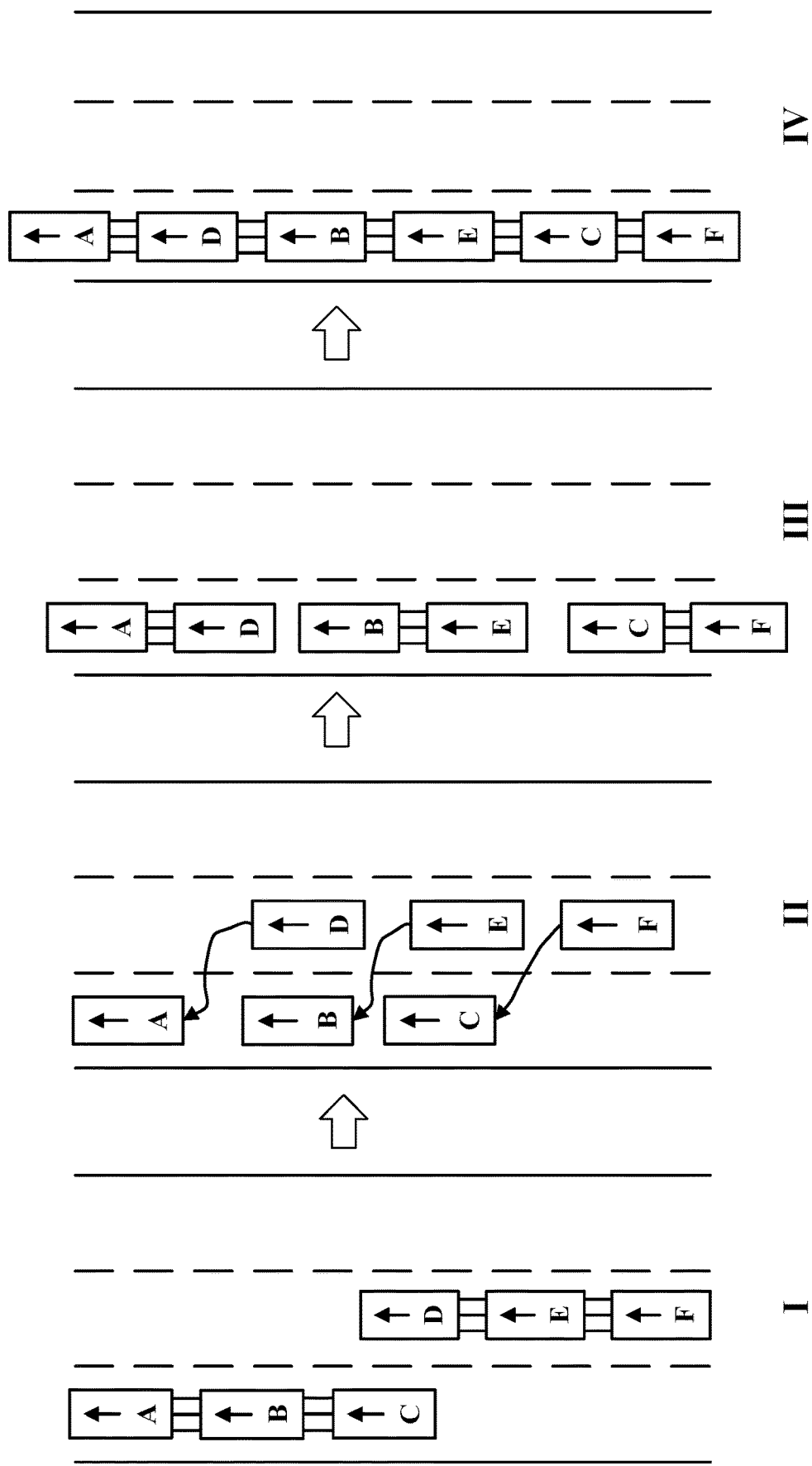
FIG. 2C illustrates an exemplary process of merging two vehicle trains, in accordance with various embodiments.

FIG. 2C illustrates an exemplary process of merging two vehicle trains, in accordance with various embodiments. In the illustrated embodiments of FIG. 2C, in stage I, two vehicle trains (e.g., a train that includes the vehicle A, vehicle B and vehicle C, another train that includes the vehicle D, vehicle E and vehicle F) are driving on the road in the same direction, as indicated by the arrows. They may identify each other and request to merge. For example, assume that the vehicle A is the lead vehicle of the train that includes the vehicle A, vehicle B and vehicle C (referred to as the first train), and that the vehicle D is the lead vehicle of the train that includes the vehicle D, vehicle E and vehicle F. In some embodiments, the vehicle D may identify the vehicle A and its train based on broadcasted information by the vehicle A, or based on an one-to-one communication connection between the vehicle D and vehicle A. Alternatively, the vehicle A may identify the vehicle D and its train similarly. In the illustrated embodiments of FIG. 2C, assume that the lead vehicle D identifies the lead vehicle A. In some embodiments, after identifying the lead vehicle A, the vehicle D may request to merge the two trains. The vehicle A may determine whether to approve the merge request from the vehicle D based on environmental conditions or other information. If the vehicle A approves the merge request, it may request the vehicle D to share public data packets of the vehicles in the train led by the vehicle D.

In stage II, based on the information in the public data packets, the vehicle A may determine a position for each vehicle in the train led by the vehicle D. Assume that the vehicle A is to travel on the road for another 100 miles, the vehicle B is to travel on the road for another 50 miles, and the vehicle C is to travel on the road for another 10 miles; while the vehicle D is to travel on the road for another 75 miles, the vehicle E is to travel on the road for another 30 miles, and the vehicle F is to travel on the road for another 5 miles. Based on the distances to be traveled by the vehicles, the vehicle A may determine an order of the vehicles. For example, a vehicle that is to travel longer may be placed in front of a vehicle that is to travel shorter. Thus, the relative position of each vehicle in the new train may be determined. The order of the vehicles in the new train may be the vehicle A, the vehicle D, the vehicle B, the vehicle E, the vehicle C and the vehicle F, as depicted.

The lead vehicle A may send signals to the vehicles in its train (e.g., the vehicle B and vehicle C) requesting them to release their latches to connect with the coming vehicles in the train led by the vehicle D (e.g., the vehicle E and vehicle F), respectively. The lead vehicle A may also send a signal to the vehicle D indicating the positions of the vehicles in the train led by the vehicle D. Upon receiving the signal, the vehicle D may send signals to the vehicles in its train (e.g., the vehicle E and vehicle F) requesting them to release their latches to connect with the vehicles in the train led by the vehicle A (e.g., the vehicle B and vehicle C), respectively.

In stage III and IV, each of the vehicles in the train led by the vehicle D is connected to the one or more neighbor vehicles. For example, the vehicle D latches on to the vehicle A and the vehicle B; the vehicle E latches on to the vehicle B and the vehicle C; the vehicle F latches on to the vehicle C. In the illustrated embodiments of FIG. 2C, the latching may be completed in two stages. For example, in stage III, the vehicle D latches on the neighboring vehicle A; the vehicle E latches on to the neighboring vehicle B; and the vehicle F latches on to the neighboring vehicle C. Then, in stage IV, the vehicle D further latches on to the other neighboring vehicle B; the vehicle E further latches on to the other neighboring vehicle C.

Referring back to FIGS. 1A-1B, the latch system 114 may be configured to physically and/or electrically connect the vehicle system 103 with another vehicle. In some embodiments, the latch system 114 of the vehicle system 103 may receive a signal from the determination module 112 as described above, to release one or more latches of the vehicle system 103. In some embodiments, the determination module 112 may determine whether the speeds of the vehicle system 103 and the other vehicle match. In addition, the determination module 112 may determine whether the two vehicles are aligned. For example, the determination module 112 may determine whether the speeds of the two vehicles match, and whether the two vehicles are aligned based on sensor data. In some embodiments, the determination module 112 in the front vehicle determines whether the speeds of the two vehicles match, and whether the two vehicles are aligned. Alternatively, in some embodiments, the determination module 112 in the back vehicle determines whether the speeds of the two vehicles match, and whether the two vehicles are aligned. In some embodiments, the determination modules 112 in both vehicles cooperate and communicate with each other to determine whether the speeds of the two vehicles match, and whether the two vehicles are aligned. Once the two vehicles match their speeds and align themselves, one or more of the determination modules 112 in the two vehicles may send signals to the latch systems 114 to connect the two vehicles. The two vehicles may latch onto each other to share power, exchange data and join the force.

Figure 3A:
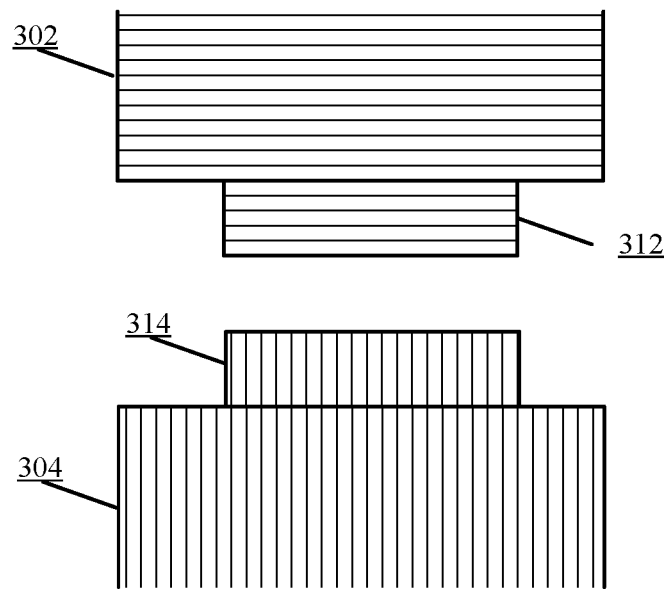
FIGS. 3A-3B are diagrams illustrating a straight motion latching of vehicles, in accordance with various embodiments.
Figure 3B:
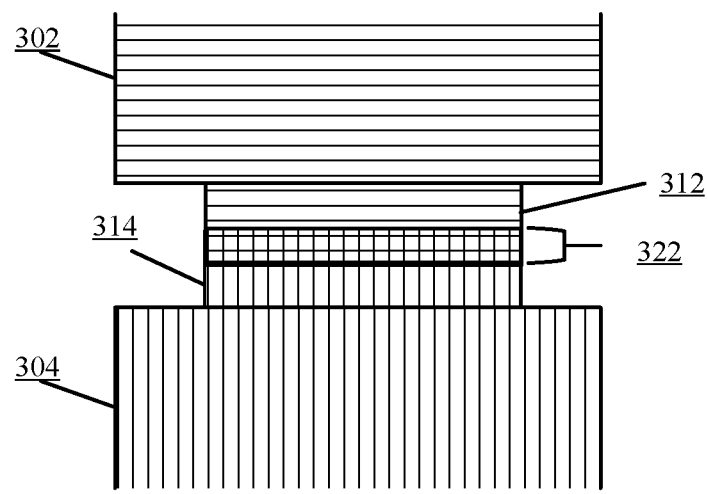

FIGS. 3A-3B are diagrams illustrating a straight motion latching of vehicles, in accordance with various embodiments. In the illustrated embodiments of FIGS. 3A-3B, each of block 302 and block 304 graphically represents a vehicle (e.g., the vehicle system 103). Block 312 graphically represents a latch of the vehicle 302. Similarly, block 314 graphically represents a latch of the vehicle 304. In the illustrated embodiments of FIG. 3A, the two vehicles 302 and 304 match their speed and align themselves straightly one after another. In the illustrated embodiments of FIG. 3B, the two vehicles 302 and 304 latch onto each other. For example, as shown in FIG. 3B, the latches 312 and 314 of the two vehicles 302 and 304 fit into each other (e.g., are coupled) and overlap. Block 322 graphically represents the overlap of the two latches 312 and 314. Such a straight motion latching of vehicles is merely one possible latching mechanism. Other types of latching mechanism are also possible.

Figure 3C:
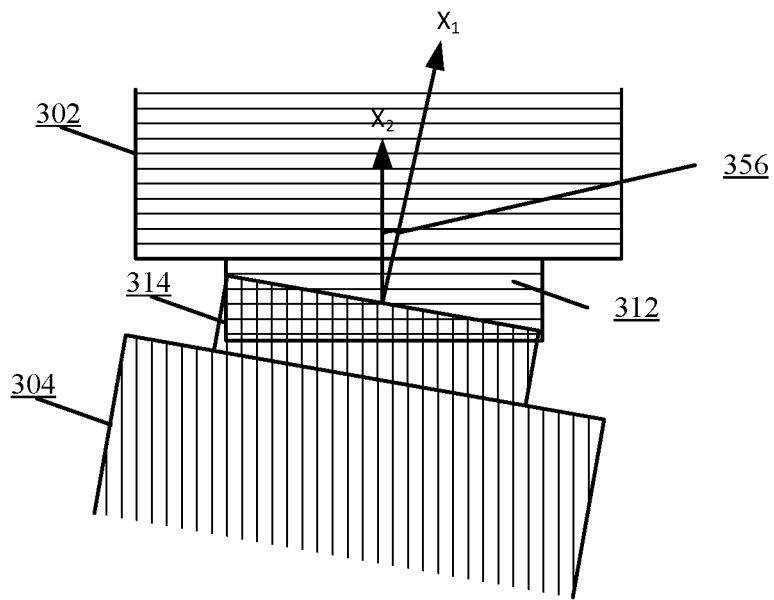
FIGS. 3C-3D are diagrams illustrating a turning motion latching of vehicles, in accordance with various embodiments.
Figure 3D:
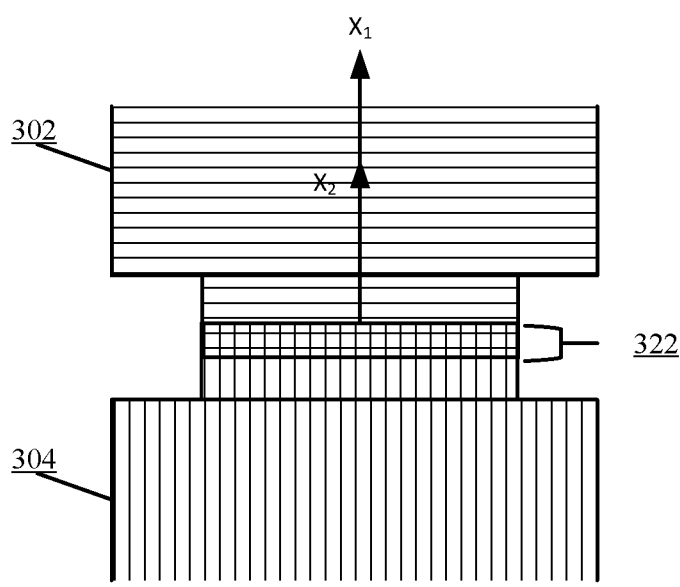

FIGS. 3C-3D are diagrams illustrating a turning motion latching of vehicles, in accordance with various embodiments. In the illustrated embodiments of FIGS. 3C-3D, the vehicle 304 approaches the vehicle 302 with an angle 356. For example, the angle 356 between the two vehicles 302 and 304 may be defined as an angle between the normal line of the edge of the latch 314 (represented by $X_1$) and the normal line of the edge of the latch 312 (represented by $X_2$). As shown in FIG. 3D, the vehicle 304 turns by the angle 356 to latch onto the vehicle 302. After turning, the vehicles 302 and 304 are coupled and their latches 312 and 314 overlap with the overlapping area as represented by block 322.

In addition to the latches (e.g., couplers) as described above with FIGS. 3A-3D, other types of latches are possible. FIG. 4A shows a diagram of engagement of active latches of vehicles, in accordance with various embodiments. Similar to the embodiments in FIGS. 3A-3D, each of half block 302 and half block 304 represents a vehicle (e.g., the vehicle system 103). The vehicle 302 has an active latch mechanism 402, which has two components as represented by graphical shapes 402a and 402b. Similarly, the vehicle 304 has another active latch mechanism including two components as represented by graphical shapes 404a and 404b. The component 402a may be a rod extending from the vehicle 302 and the component 402b may include a hook. Similarly, the component 404a may be a rod extending from the vehicle 304 and the component 402b may include a hook. The components 402a and 402b, 404a and 404b of the active latches 402, 404 may be connected to each other and may be made of metal sticks, metal board, etc. In some embodiments, the active latch 402 may be electronically controlled by the vehicle 302 to engage or disengage once the vehicle 302 is ready to latch onto the vehicle 304. Similarly, the active latch 404 may be electronically controlled by the vehicle 304 to engage or disengage once the vehicle 304 is ready to latch onto the vehicle 302. In some embodiments, when the active latch 402 is electronically controlled by the vehicle 302 to engage, the components 402a and 402b may form an angle. Similarly, the components 404a and 404b may also form an angle once it is controlled to engage.

Figure 4B:
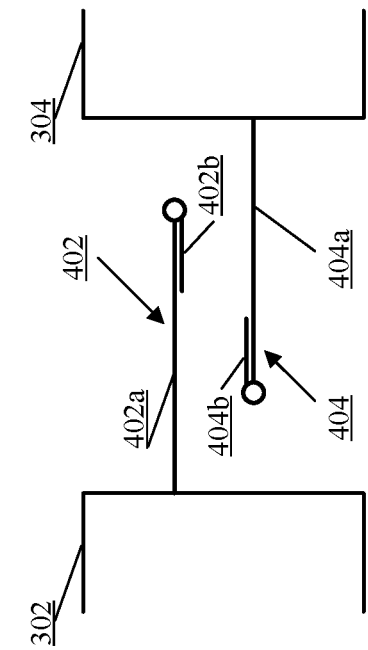
FIG. 4B is a diagram illustrating disengagement of active latches of vehicles, in accordance with various embodiments.
Figure 4A:
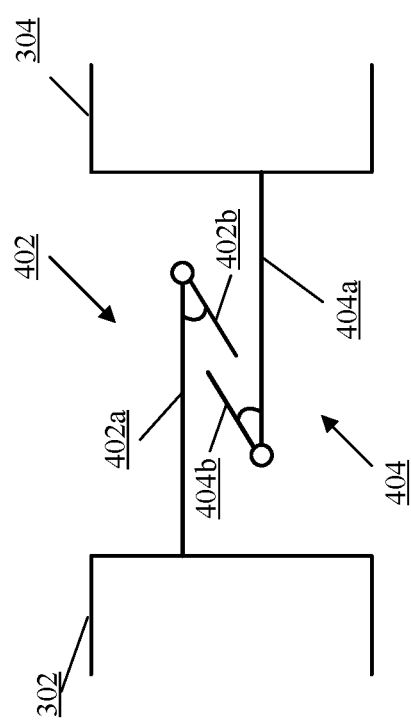
FIG. 4A is a diagram illustrating engagement of active latches of vehicles, in accordance with various embodiments.

In some embodiments, the vehicles 302 and 304 match their speeds and approach with disengaged latches, as shown in FIG. 4B. Referring to FIG. 4B, illustrated is a diagram of disengagement of active latches of vehicles, in accordance with various embodiments. In the illustrated embodiments of FIG. 4B, the components 402b and 404b of the latches 402, 404 are retracted respectively. In some embodiments, the vehicles 302 and 304 push towards each other until both of the active latches 402, 404 are controlled to engage with each other so that the vehicles 302 and 304 latch onto each other. Such a process may be referred to as an active latching process.

Figure 4C:
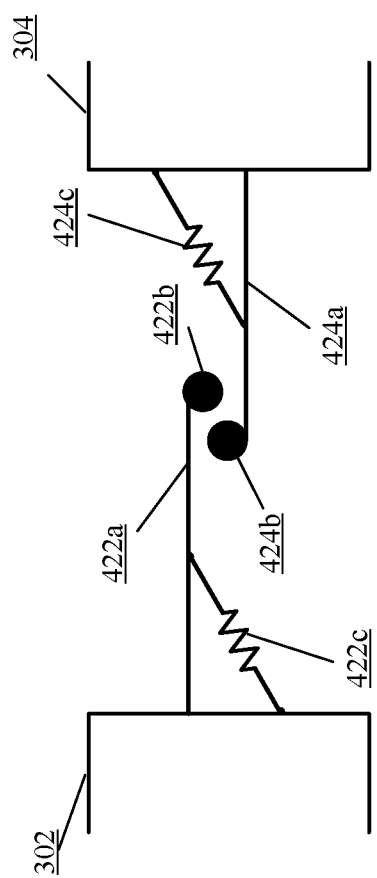
FIG. 4C is a diagram illustrating engagement of passive latches of vehicles, in accordance with various embodiments.

FIG. 4C is a diagram illustrating engagement of passive latches of vehicles, in accordance with various embodiments. In the illustrated embodiments, graphical shapes 422a, 422b and 422c represent a passive latch mechanism equipped on the vehicle 302. Similarly, graphical shapes 424a, 424b and 424c represent a passive latch mechanism equipped on the vehicle 304. The components 422a and 424a may be metal sticks, metal plate, etc. The components 422b and 424b each may be a mechanism such as a knob, or a "hitch" that is connected to the components 422a and 424a respectively. The components 422c and 424c may be springs connected to the components 422a and 424a to control the up and down movement of the components 422a and 422b, 424a and 424b, respectively. As shown in FIG. 4C, the passive latches including the components 422a, 422b and 422c and the components 424a, 424b and 424c respectively are designed to be able to latch onto each other through the "hitches" 422b and 424b controlled by the springs 422c and 424c. When the springs 422c and 424c are both loosen, the "hitches" 422b and 424b may be separated so that the vehicles 302 and 304 are separated.

Figure 4E:
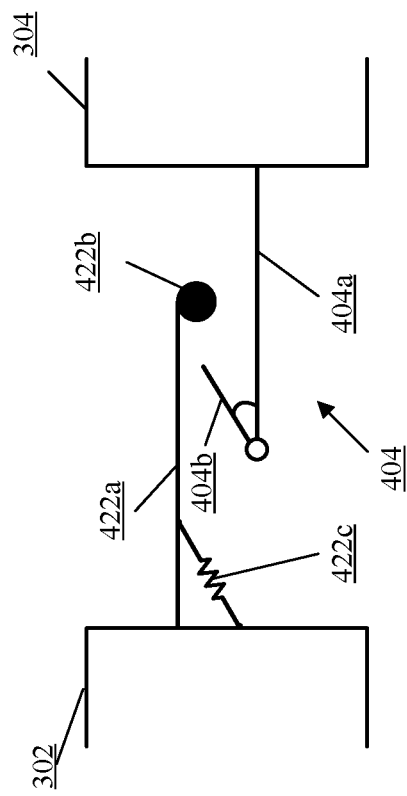
FIGS. 4D-4E are diagrams illustrating exemplary engagements of an active latch and a passive latch of vehicles, in accordance with various embodiments.
Figure 4D:
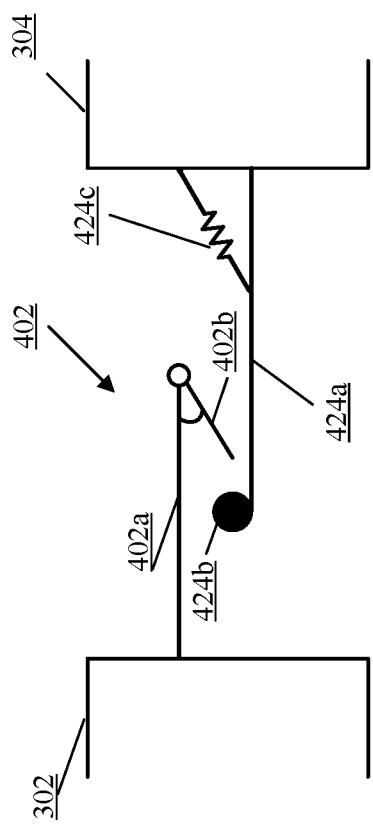

FIGS. 4D-4E are diagrams illustrating exemplary engagements of an active latch and a passive latch of vehicles, in accordance with various embodiments. In the illustrated embodiments of FIG. 4D, the vehicle 302 is equipped with an active latch mechanism 402 including components 402a and 402b which form an angle, as described above with reference to FIG. 4A. The vehicle 304 is equipped with a passive latch mechanism including components 424a, 424b and 424c, as described above with reference to FIG. 4C. As shown in FIG. 4D, the active latch mechanism 402 of the vehicle 302 and the passive latch mechanism of the vehicle 304 may work together to latch the two vehicles 302 and 304. For example, the component 402b of the active latch 402 may be electronically controlled by the vehicle 302 to engage with the "hitch" 424b of the vehicle 304 controlled by the spring 424c. After engagement of the components 402b of the active latch 402 of the vehicle 302 and the "hitch" 424b of the vehicle 304, the two vehicles 302 and 304 latch onto each other. In such a situation, the vehicle 302 and the vehicle 304 may approach each other with the disengaged latches and match their speeds. The vehicle 302 may control the active latch to engage once the vehicles 302 and 304 become close enough and push towards each other.

Alternatively, in the illustrated embodiments of FIG. 4E, the vehicle 302 is equipped with a passive latch mechanism including components 422a, 422b and 422c, as described above with reference to FIG. 4C. The vehicle 304 is equipped with an active latch mechanism 404 including components 404a and 404b which form an angle, as described above with reference to FIG. 4A. the passive latch mechanism of the vehicle 302 and the active latch mechanism 404 of the vehicle 304 may work together to latch the two vehicles 302 and 304, in a similar manner as described above with reference to FIG. 4D.

Figure 5:
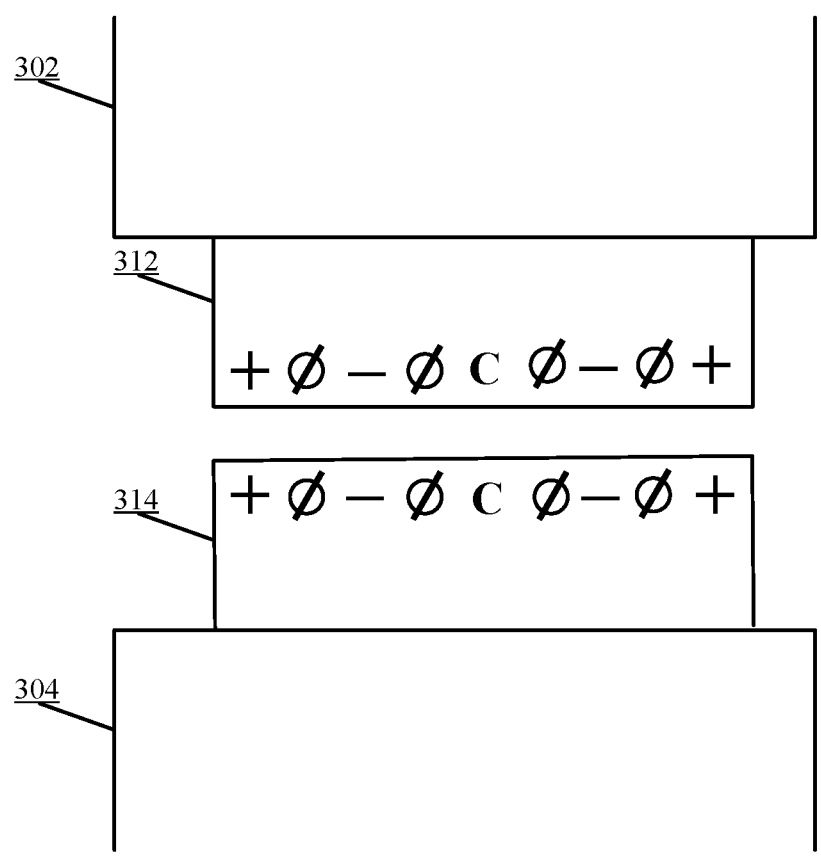
FIG. 5 illustrates exemplary electrical connections in latches of vehicles, in accordance with various embodiments.

FIG. 5 illustrates exemplary electrical connections in latches of vehicles, in accordance with various embodiments. In the illustrated embodiments of FIG. 5, the latches 312 and 314 of the respective vehicles 302 and 304 form a symmetric connection for the vehicles 302 and 304 to exchange power and data. Symbols "+" and "−" represent power lines of the respective vehicles 302 and 304. Symbols "C" represent control lines of the respective vehicles 302 and 304. The control lines "C" of the two vehicles 302 and 304 may enable data exchange between the vehicles 302 and 304 once connected. In some embodiments, the control lines "C" are used to check if the vehicles 302 and 304 are aligned. For example, after the two vehicles 302 and 304 latch onto each other, the control lines "C" in the latches 312 and 314 may be checked to determine whether they are connected by checking if a signal or data can be transmitted and received through the control lines "C" between the vehicles 302 and 304. If the check fails, the vehicles 302 and 304 may repeat the latching process again. If the check of the control lines "C" passes, which means the vehicles 302 and 304 are well aligned, the power exchange through the power lines "+" and "−" may be enabled by the vehicles 302 and 304. Symbols "Ø" represents buffers that prevent the other lines (e.g., the power lines and the control line of each vehicle) from overlapping. In some embodiments, the buffers "Ø" may be areas disconnected with any other areas (e.g., electrical insulant isolating the power lines or control line). For example, the buffers "Ø" may be grounded.

In some embodiments, the vehicles 302 and 304 may have more lines than described above to facilitate the connection between each other. In some embodiments, the vehicles 302 and 304 may have different line configurations than described above to enable the exchange of power or data between each other. For example, the vehicles 302 and 304 may have a different power-line configuration than described above to achieve the exchange of power between them.

FIG. 6A illustrates a flowchart of an exemplary method 600 for forming a vehicle train, according to various embodiments of the present disclosure. The method 600 may be implemented in various environments including, for example, the system 100 of FIG. 1A or the system 150 of FIG. 1B. The exemplary method 600 may be implemented by one or more components of the system 102 or 103 (e.g., the processor 104, the memory 106). The exemplary method 600 may be implemented by multiple systems similar to the system 102 or 103. The operations of method 600 presented below are intended to be illustrative. Depending on the implementation, the exemplary method 600 may include additional, fewer, or alternative steps performed in various orders or in parallel.

At block 602, a first vehicle may detect a second vehicle traveling in the same direction as the first vehicle on a road. At block 604, the first vehicle may request a public data packet associated with the second vehicle via a communication signal, wherein the public data packet associated with the second vehicle comprises travel information of the second vehicle. At block 606, in response to receiving the public data packet associated with the second vehicle, the first vehicle may determine a lead vehicle of a vehicle train among the first vehicle and the second vehicle based on the public data packet associated with the second vehicle and a public data packet associated with the first vehicle, wherein the lead vehicle controls the vehicle train. At block 608, in response to determining the first vehicle as the lead vehicle, the first vehicle connects with the second vehicle. For example, the first vehicle latches on to the front or back of the second vehicle to form the vehicle train. At block 610, in response to determining the second vehicle as the lead vehicle, the first vehicle monitors a latch signal from the second vehicle to latch on to the second vehicle, and the first vehicle transmits the public data packet associated with the first vehicle to the second vehicle.

FIG. 6B illustrates a flowchart of an exemplary method 620 for joining a vehicle train, according to various embodiments of the present disclosure. The method 620 may be implemented in various environments including, for example, the system 100 of FIG. 1A or the system 150 of FIG. 1B. The exemplary method 620 may be implemented by one or more components of the system 102 or 103 (e.g., the processor 104, the memory 106). The exemplary method 620 may be implemented by multiple systems similar to the system 102 or 103. The operations of method 620 presented below are intended to be illustrative. Depending on the implementation, the exemplary method 620 may include additional, fewer, or alternative steps performed in various orders or in parallel.

At block 622, a first vehicle may identify a lead vehicle of a vehicle train traveling in the same direction as the first vehicle on a road. At block 624, the first vehicle may send a request to join the vehicle train to the lead vehicle. At block 626, in response to receiving an approval of the request from the lead vehicle, the first vehicle may transmit a public data packet associated with the first vehicle to the lead vehicle through a communication signal, wherein the public data packet associated with the first vehicle comprises travel information of the first vehicle. At block 628, the first vehicle may receive position information from the lead vehicle, wherein the position information comprises a position in the vehicle train assigned to the first vehicle. At block 630, the first vehicle may join the vehicle train at the assigned position, wherein the first vehicle may latch on to one or more neighbor vehicles in the vehicle train.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 7:
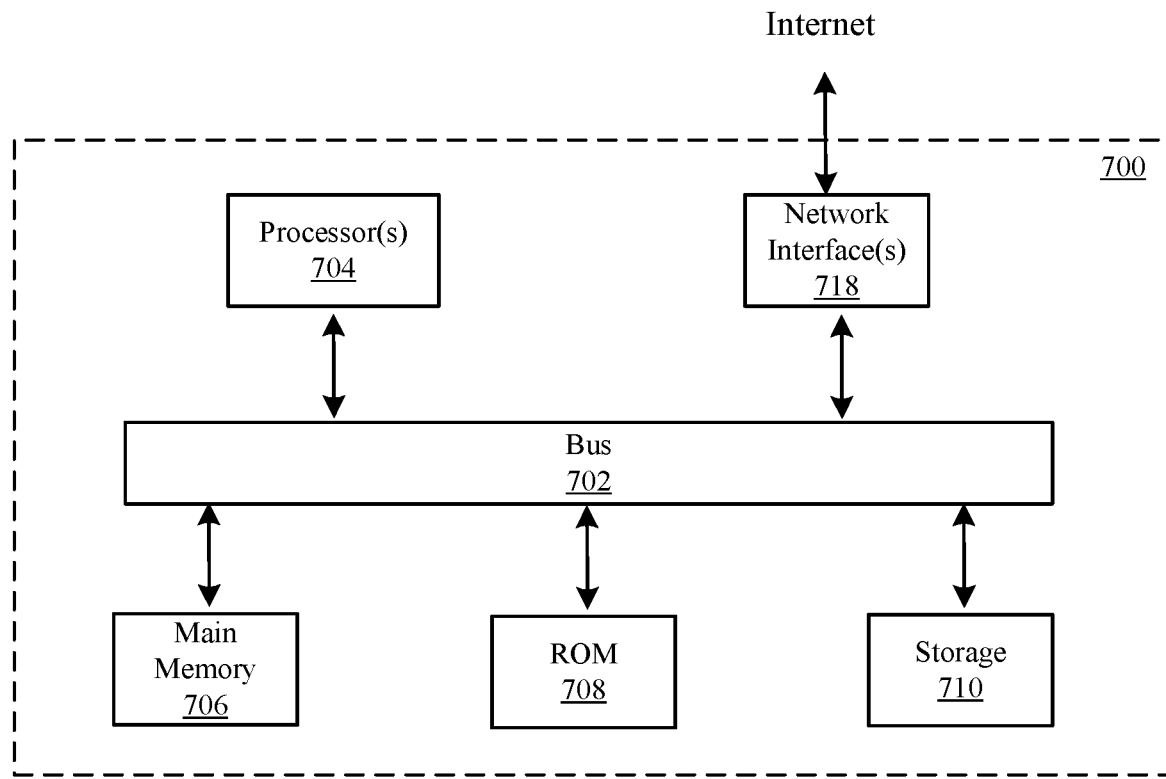
FIG. 7 illustrates a block diagram of an exemplary computer system in which any of the embodiments described herein may be implemented.

FIG. 7 is a block diagram that illustrates a computer system 700 upon which any of the embodiments described herein may be implemented. The system 700 may correspond to the system 102 or 103 described above. The computer system 700 includes a bus 702 or other communication mechanism for communicating information, one or more hardware processors 704 coupled with bus 702 for processing information. Hardware processor(s) 704 may be, for example, one or more general purpose microprocessors. The processor(s) 704 may correspond to the processor 104 described above.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions. The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The main memory 706, the ROM 708, and/or the storage 710 may correspond to the memory 106 described above.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The main memory 706, the ROM 708, and/or the storage 710 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

The computer system 700 can send messages and receive data, including program code, through the network(s), network link and network interface 718. In the Internet example, a server might transmit a requested code for an application program through the Internet, the ISP, the local network and the network interface 718. The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry. The vehicles in the embodiments described above may be autonomous, partially autonomous, or controlled by humans. If a vehicle is controlled by a human driver who would like to join the train, the driver may control the vehicle to perform some of the steps described above.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The invention claimed is:

1. A computer-implemented method, comprising:
   detecting, by a first vehicle, a second vehicle traveling in the same direction as the first vehicle;
   receiving, by the first vehicle, a plurality of features of the second vehicle, wherein the plurality of features of the second vehicle comprise at least one of the following: a planned travel distance of the second vehicle, a battery or gas level of the second vehicle, a quantity of sensors equipped on the second vehicle, and an amount of sensor data that the second vehicle is capable of capturing;
   determining, by the first vehicle, a lead vehicle of a vehicle train between the first vehicle and the second vehicle based on a plurality of features of the first vehicle and the plurality of features of the second vehicle, the determination comprises at least one of the following:
      determining one of the first and second vehicles that has a longer planned travel distance as the lead vehicle,
      determining one of the first and second vehicles that has a higher battery or gas level as the lead vehicle,
      determining one of the first and second vehicles that is equipped with a greater quantity of sensors as the lead vehicle, and
      determining one of the first and second vehicles that is capable of capturing a greater amount of sensor data as the lead vehicle; and
   connecting, by the first vehicle, with the second vehicle to form the vehicle train, wherein the determined lead vehicle is connected in front of the other vehicle.

2. The method of claim 1, wherein connecting with the second vehicle comprises:
   matching a speed of the first vehicle and the second vehicle;
   aligning the first vehicle and the second vehicle; and moving the first vehicle and the second vehicle toward each other until a latch of the first vehicle engages with a latch of the second vehicle.

3. The method of claim 2, further comprising:
connecting a control line of the first vehicle with a control line of the second vehicle.

4. The method of claim 3, further comprises:
determining whether the control lines of the first and second vehicles have been connected; and
if yes, connecting a power line between the first vehicle and the second vehicle.

5. The method of claim 1, further comprising:
communicating, by the lead vehicle, a brake signal to the other vehicle, wherein the brake signal includes an instruction on braking the other vehicle.

6. The method of claim 1, further comprising:
determining, by the lead vehicle, to change from a current lane to another lane;
communicating, by the lead vehicle, a change-lane signal to the other vehicle;
disconnecting the first vehicle and the second vehicle; and
re-connecting the first vehicle and the second vehicle after the first vehicle and the second vehicle both have changed to the another lane.

7. The method of claim 1, further comprising:
receiving, by the lead vehicle, a request to join the vehicle train from a third vehicle, wherein the request comprises a plurality of features of the third vehicle;
determining, by the lead vehicle, whether to approve the request from the third vehicle based on the plurality of features of the third vehicle;
if approved, determining, by the lead vehicle, a position in the vehicle train of the third vehicle based on the plurality of features of the third vehicle; and
connecting the third vehicle in the vehicle train at the determined position.

8. The method of claim 7, wherein determining whether to approve the request from the third vehicle is further based on the number of vehicles in the vehicle train.

9. The method of claim 7, wherein determining, by the lead vehicle, a position in the vehicle train of the third vehicle is further based on a plurality of features of the other vehicles in the vehicle train.

10. The method of claim 1, further comprising:
receiving, by the lead vehicle, a request to exit from the vehicle train from one of a plurality of vehicles in the vehicle train;
determining, by the lead vehicle, whether to approve the request to exit from the vehicle train based on environment information detected by sensors of the plurality of vehicles in the vehicle train; and
in response to determining to approve the request to exit from the vehicle train, releasing the connection of each of one or more neighbor vehicles in the vehicle train to allow the vehicle to exit from the vehicle train.

11. A computer-implemented method for joining a vehicle train, comprising:
identifying, by a first vehicle, a lead vehicle of the vehicle train traveling in the same direction as the first vehicle on a road;
sending, by the first vehicle, a request to join the vehicle train to the lead vehicle, the request including a plurality of features of the first vehicle, wherein the plurality of features comprise at least one of the following: a planned travel distance of the first vehicle, a battery or gas level of the first vehicle, a quantity of sensors equipped on the first vehicle, and an amount of sensor data that the first vehicle is capable of capturing;
receiving, by the first vehicle, position information indicating a position in the vehicle train assigned to the first vehicle from the lead vehicle, wherein the position is determined based on the plurality of features of the first vehicle; and
connecting, by the first vehicle, to the vehicle train at the position.

12. The method of claim 11, wherein the first vehicle is a lead vehicle of another vehicle train, and wherein the method further comprises connecting vehicles in the other vehicle train to the vehicle train.

13. The method of claim 11, wherein the position information is determined based on the plurality of features of the first vehicle.

14. A system for forming a vehicle train, the system comprising:
one or more processors; and
a memory storing instructions that, when executed by the one or more processors, cause the system to perform operations comprising:
detecting a second vehicle traveling in the same direction as a first vehicle associated with the system on a road;
receiving a plurality of features of the second vehicle, wherein the plurality of features of the second vehicle comprise at least one of the following: a planned travel distance of the second vehicle, a battery or gas level of the second vehicle, a quantity of sensors equipped on the second vehicle, and an amount of sensor data that the second vehicle is capable of capturing;
determining a lead vehicle of the vehicle train between the first vehicle and the second vehicle based on a plurality of features of the first vehicle and the plurality of features of the second vehicle, the determination comprises at least one of the following:
determining one of the first and second vehicles that has a longer planned travel distance as the lead vehicle,
determining one of the first and second vehicles that has a higher battery or gas level as the lead vehicle,
determining one of the first and second vehicles that is equipped with a greater quantity of sensors as the lead vehicle, and
determining one of the first and second vehicles that is capable of capturing a greater amount of sensor data as the lead vehicle; and
connecting the first vehicle and the second vehicle to form the vehicle train, wherein the determined lead vehicle is connected in front of the other vehicle.

15. The system of claim 14, wherein connecting with the second vehicle comprises:
matching a speed of the first vehicle and the second vehicle;
aligning the first vehicle and the second vehicle; and
moving the first vehicle and the second vehicle toward each other until a latch of the first vehicle engages with a latch of the second vehicle.

16. The system of claim 14, wherein the operations further comprise:
connecting a control line of the first vehicle with a control line of the second vehicle.

17. The system of claim 14, wherein the operations further comprise:

determining whether control lines of the first and second vehicles have been connected; and if yes, connecting a power line between the first vehicle and the second vehicle.

18. The system of claim 14, wherein the operations further comprise:

communicating, by the lead vehicle, a brake signal to the other vehicle, wherein the brake signal includes an instruction on braking the other vehicle.

19. The system of claim 14, wherein the operations further comprise:

determining, by the lead vehicle, to change from a current lane to another lane;

communicating, by the lead vehicle, a change-lane signal to the other vehicle;

disconnecting the first vehicle and the second vehicle; and re-connecting the first vehicle and the second vehicle after the first vehicle and the second vehicle both have changed to the another lane.

20. The system of claim 14, wherein the operations further comprise:

receiving, by the lead vehicle, a request to join the vehicle train from a third vehicle, wherein the request comprises a plurality of features of the third vehicle;

determining, by the lead vehicle, whether to approve the request from the third vehicle based on the plurality of features of the third vehicle;

if approved, determining, by the lead vehicle, a position in the vehicle train of the third vehicle based on the plurality of features of the third vehicle; and connecting the third vehicle in the vehicle train at the determined position.

\* \* \* \* \*